(12) United States Patent
Hageman et al.

(10) Patent No.: US 12,381,802 B2
(45) Date of Patent: Aug. 5, 2025

(54) SYSTEM AND METHOD FOR DEADZONE ROUTING OF DIRECTIONAL COMMUNICATIONS

(71) Applicant: Rockwell Collins, Inc., Cedar Rapids, IA (US)

(72) Inventors: Michael L. Hageman, Mt. Vernon, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 425 days.

(21) Appl. No.: 18/083,010

(22) Filed: Dec. 16, 2022

(65) Prior Publication Data

US 2024/0205125 A1 Jun. 20, 2024

(51) Int. Cl.
*H04W 74/00* (2009.01)
*H04L 43/0882* (2022.01)
*H04W 76/15* (2018.01)

(52) U.S. Cl.
CPC ....... *H04L 43/0882* (2013.01); *H04W 74/002* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 7,091,902 B2 | 8/2006 | Liu et al. |
| 7,496,059 B2 | 2/2009 | Yoon |
| 7,957,355 B1 | 6/2011 | Heiferling et al. |
| 10,264,511 B2 | 4/2019 | Baroudi et al. |
| 2012/0042075 A1 | 2/2012 | Goetz et al. |
| 2019/0086938 A1 | 3/2019 | Shattil |
| 2019/0394094 A1 | 12/2019 | Mandle et al. |
| 2020/0036101 A1 | 1/2020 | Scheucher |
| 2021/0243072 A1 | 8/2021 | Peterson et al. |
| 2022/0107425 A1 | 4/2022 | Hornsby et al. |

OTHER PUBLICATIONS

Extended European Search Report dated May 2, 2024; European Application No. 23211420.7.

*Primary Examiner* — Abdelillah Elmejjarmi
(74) *Attorney, Agent, or Firm* — Suiter Swantz IP (57) ABSTRACT

A system and method for tactical routing of directional communications identifies directional communications links from a transmitting (Tx) node to a receiving (Rx) node of a multi-node network. Within the network environment, the Tx node identifies deadzones, or areas wherein directional communications links between the Tx and Rx nodes may be constrained. The Tx node assigns each identified directional communications link a link cost; constrained links are assigned a higher cost than unconstrained links. Based on the assigned link costs (and other link cost information received from other network nodes), the Tx node constructs an optimal transmission route to the desired Rx node, the transmission route comprising a sequence one of more directional links selected to optimally fulfill mission objectives (e.g., minimal aggregate link cost).

19 Claims, 8 Drawing Sheets

SYSTEM AND METHOD FOR DEADZONE ROUTING OF DIRECTIONAL COMMUNICATIONS

BACKGROUND

Historically, most communications systems configured for tactical communication in a contested environment (e.g., a theater or other like scenario where communications may be subject to interference, jamming, detection, and/or interception of hostile and/or natural origin) transmit and receive via omnidirectional systems due to low system and subsystem complexity requirements. Recently there has been a push toward directional communications in order to gain tactical advantage, despite the added complexity. Successful directional communications in a contested environment depend on a low probability of detection (LPD) of friendly transmissions by hostiles (and, e.g., following from LPD, low probability of interception (LPI) and/or low probability of geolocation (LPG)). However, contested environments are associated with deadzones, which constrain or preclude entirely transmission capability in a given direction. Even in non-contested environments, some directional transmissions may be constrained, for example, by friendly aircraft configurations and payload.

SUMMARY

In a first aspect, a transmitting (Tx) communications node of a multi-node network configured for tactical routing of directional transmissions through the network is disclosed. In embodiments, the node includes a communications interface configured for directional transmissions to one or more receiving (Rx) nodes of the network. The node includes a controller for identifying directional communications links via which a directional transmission from the node reaches a desired Rx node. The node identifies (e.g., per mission protocols or intelligence, via direct sensor detection, via communications received from other nodes) deadzones within the network environment where directional transmissions are partially or fully constrained. The node assigns a link cost to each discovered directional communications link; constrained links are assigned a higher cost relative to unconstrained links. The node receives link cost information from other nodes of the network, the link cost information including link costs assigned by other nodes to directional links from the assigning node to other network nodes. Based on the assigned link costs, as well as link cost information received from other nodes, the node constructs a transmission route to the desired Rx node, the transmission route comprising one or more directional node-to-node communication links selected to optimally fulfill mission objectives.

In some embodiments, the optimal transmission route is selected to achieve a minimal aggregate link cost between the node and the Rx node.

In some embodiments, the identified deadzones include platform-based deadzones based on, for example: gaps in transmitting capability inherent to the node; physical obstructions preventing the node from transmitting in a particular direction; transmitting equipment failure; and/or physical damage to a transmitting node.

In some embodiments, the identified deadzones include geographical deadzones wherein transmission in a particular direction is associated with a likelihood of detection and/or interception of the transmitted signal.

In some embodiments, the network environment includes both platform and geographic deadzones. For example, platform and geographic deadzones may both be assigned high link costs, but geographic deadzones may be assigned higher link costs relative to platform deadzones.

In some embodiments, some deadzones may be mobile, e.g., they may shift position and/or orientation based on movement of a transmitting node or of a hostile node, if said node is embodied in a mobile platform.

In some embodiments, a directional communications link between nodes may be constrained with respect to directional transmissions from the first node to the second node, but not constrained with respect to directional transmissions from the second node to the first node.

In some embodiments, the node or the Rx node is embodied aboard a mobile platform, e.g., a mobile manpack, vehicle, or aircraft.

In some embodiments, the node constructs an optimal transmission route to the Rx node with the intent of avoiding one or more identified deadzones, the optimal transmission route being an indirect or multi-hop route incorporating any of: a directional transmission from the node to a relay node, a directional transmission from a relay node to the Rx node, or a directional transmission between two intermediate relay nodes on the transmission route between the node and the Rx node.

In some embodiments, directional transmissions by the node toward the Rx node may be constrained in a particular direction with respect to some planes but not with respect to other planes. For example, a ground-based hostile may create a geographic deadzone with respect to directional transmissions along a horizontal plane substantially parallel with the ground, but the transmitting node may construct a transmission route to the Rx node via one or more directional links evading the hostile by transmitting through an unconstrained plane, e.g., in a substantially vertical direction above the scope of the ground-based hostile.

In some embodiments, the node constructs a transmission route to the Rx node by incorporating one or more directional communications links wherein a transmitting node avoids an identified deadzone by adjusting its transmission power (e.g., to avoid detection of the transmitted signal by a hostile).

In a further aspect, a method for tactical routing of directional communications is also disclosed. In embodiments, the method includes identifying, via a transmitting (Tx) node of a multi-node communications network, paths to a receiving (Rx) node of the network, each path comprising one or more directional communications links (e.g., a directional transmission from a first node to a second node). The method includes identifying, via the Tx node, deadzones within the network environment, each deadzone capable of partially or fully constraining a directional transmission between nodes. The method includes assigning each identified directional communications link a link cost; for example, constrained links are assigned high link costs and non-constrained links are assigned low link costs. The method includes receiving link costs assigned to other directional links connecting the assigning nodes to other nodes of the network. The method includes, based on the assigned link costs and/or received link cost information received other nodes of the network, constructing an optimal transmission route to each Rx node, each transmission route comprising a sequence of directional communications links connecting the Tx node to the Rx node and optimized based on applicable mission requirements.

In some embodiments, the method includes constructing an optimal transmission route to minimize aggregate link cost among all component directional communications links of the route.

In some embodiments, the method includes identifying platform deadzones that constrain the Tx node from transmitting in one or more directions. For example, platform deadzones may be associated with any of: design choices causing inherent gaps in transmission capability; physical obstructions blocking transmission by the Tx node; equipment failures with respect to the Tx node; or physical damage to the Tx node.

In some embodiments, the method includes identifying geographical deadzones, or areas wherein transmission in a particular direction is associated with a possible detection or interception of the transmitted signal.

In some embodiments, the method includes identifying both platform and geographical deadzones. Further, the method includes assigning higher link costs to links constrained by geographic deadzones relative to the link costs assigned to links constrained by platform deadzones.

In some embodiments, the method includes constructing an optimal transmission route from the Tx node to the Rx node to avoid identified deadzones, wherein the transmission route includes any of: a directional link from the Tx node to a relay hop node; a directional link from a relay hop node to the Rx node; or a directional link from a first intermediate relay hop node to a second intermediate relay hop node.

In some embodiments, a directional transmission between a first node and a second node is constrained by a deadzone with respect to some planes but not constrained with respect to other planes, and the method includes constructing a transmission route incorporating a directional link between the two nodes that avoids the deadzone by transmitting through the non-constrained plane.

In some embodiments, the method includes constructing a transmission route incorporating a directional link between the two nodes that avoids the deadzone by adjusting the power of the transmitted signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 1:
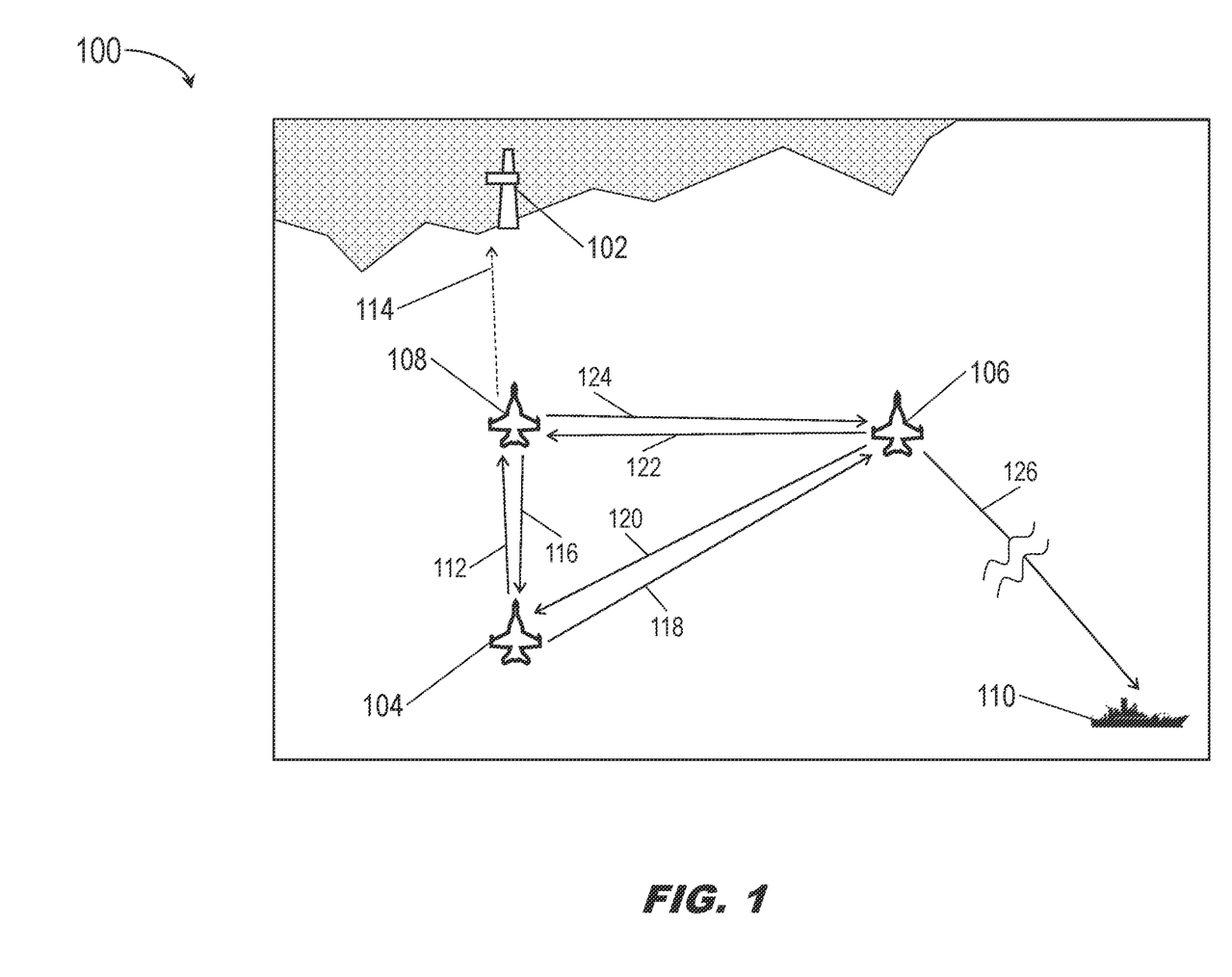
FIG. 1 is a diagrammatic overhead view illustrating a contested environment wherein directional communications are constrained by deadzones.

Referring now to FIG. 1, the contested environment 100 is shown. The contested environment may include hostile 102 and friendly aircraft 104, 106, 108.

In embodiments, the contested environment 100 may be a battlefield or theater of operations wherein the friendly aircraft 104, 106, 108 may communicate with each other via tactical directional communications. Further, the friendly aircraft 104, 106, 108 may remain in motion while communicating; in some embodiments one or more of the friendly aircraft may remain at a fixed location or may exchange directional communications with other friendly assets 110 (which friendly assets may themselves be mobile platforms or have a fixed location). For example, the friendly aircraft 104 may transmit messages to the friendly aircraft 106 in a transmitting direction, and receive messages from the friendly aircraft 106 in a receiving direction (e.g., the receiving direction being substantially opposite the transmitting direction).

In embodiments, the hostile 102 may be a ground-based outpost of fixed location or a mobile platform. For example, the hostile 102 may be configured to detect and/or intercept tactical communications between the friendly aircraft 104, 106, 108 throughout at least a portion of the contested environment 100. For example, the friendly aircraft 104 may transmit messages to the friendly aircraft 108 in a transmitting direction 112, but these transmissions may be in danger of detection or interception (114) by the hostile 102. Accordingly, the friendly aircraft 104 may be required to limit transmission power in the transmitting direction 112 in order to lessen the likelihood of detection, but this is only possible if the friendly aircraft 104 is aware of the hostile 102 and of its location. Otherwise, the only way to minimize probability of detection/interception 114 of transmissions from the friendly aircraft 104 to the friendly aircraft 108 would be to forgo any transmissions in the transmitting direction 112.

In embodiments, the friendly aircraft 104, 106, 108 may be configured for directional transmissions (e.g., or receptions) in some directions but not in others. For example, as described in greater detail below, the friendly aircraft 104, 106, 108 may each be unable to transmit in an aft direction; due to the configuration of the friendly aircraft, a platform-type deadzone may constrain such directional transmissions. Accordingly, directional transmissions 116 from the friendly aircraft 108 directly to the friendly aircraft 104 may be constrained.

In embodiments, each of the friendly aircraft 104, 106, 108 may route directional transmissions to each other via friendly aircraft in order to avoid any known or potential constraints on directional transmissions. For example, one or more of the friendly aircraft 104, 106, 108 may be aware of the location of the hostile 102 (which may provide a geographic deadzone constraining directional transmissions in one or more directions, as explained in greater detail below). Further, each friendly aircraft 104, 106, 108 may discover communications links (e.g., via hello messages or any other like appropriate routing protocol) to each other friendly aircraft and/or to any other friendly assets 110 within the contested environment 100. The friendly aircraft 104, 106, 108 may share link discovery information as well as other pertinent information, e.g., the location of the hostile 102.

In embodiments, each friendly aircraft 104, 106, 108 may determine an optimal transmission route for directional transmissions to other friendly aircraft, and to other friendly assets 110, by assigning a link cost (e.g., link priority) to each discovered directional communications link. For example, the friendly aircraft 104 may discover directional communications links 112, 118 to the friendly aircraft 106, 108 respectively. Similarly, the friendly aircraft 106 may discover directional communications links 120, 122 to the friendly aircraft 104, 108 respectively, and the friendly aircraft 108 may discover communications links 116, 124 to the friendly aircraft 104, 106 respectively.

In embodiments, each friendly aircraft 104, 106, 108 may assign a low link cost (e.g., high link priority) to any directional communications link not constrained by a known deadzone, and a high link cost (e.g., low link priority) to any directional communications link constrained by a known deadzone. For example, the friendly aircraft 104 may assign the unconstrained directional communications link 118 to the friendly aircraft 106 a low link cost, and the constrained directional communications link 112 to the friendly aircraft 108 a high link cost (due to the possibility of detection/interception (114) by the hostile 102). Similarly, the friendly aircraft 106 may assign the directional communications links 120 and 122 (to, respectively, the friendly aircraft 104, 108) a low link cost, as neither link is constrained by a deadzone. (In some embodiments, the friendly aircraft 106 may additionally maintain communications with other friendly assets 110 via a directional communications link 126). Finally, the friendly aircraft 108 may assign the directional communications link 116 to the friendly aircraft 104 a high link cost (due to platform-based constraint upon aft-directed transmissions, as described in greater detail below) and the directional communications link 124 to the friendly aircraft 106 a low link cost.

In embodiments each friendly aircraft 104, 106, 108 may share assigned link costs with each other (e.g., via link status advertisements), in order that each friendly aircraft may determine an optimal transmission route for directional communications to the other friendly aircraft and/or assets with which it may communicate. For example, each friendly aircraft 104, 106, 108 may communicate with other (e.g., remotely located, not shown by FIG. 1) friendly assets via the friendly asset 110 (e.g., which may serve as a communications relay between the friendly aircraft and other friendly assets in other parts of the contested environment 100).

In embodiments, each friendly aircraft 104, 106, 108 may utilize shared link cost information to determine an optimal transmission route to any other friendly aircraft, whether or not the other friendly aircraft is a one-hop neighbor. For example, the friendly aircraft 104 may have, based on its own link cost assignments, a low-link-cost directional communications link 118 for transmitting to the friendly aircraft 106 and a high-link-cost directional communications link 112 for transmitting to the friendly aircraft 108. Accordingly, in embodiments the friendly aircraft 104 may refer to shared link cost assignments in order to optimize, if possible, transmission routes to the friendly aircraft 106, 108. For example, referring also to FIG. 2, the friendly aircraft 104 may determine that an indirect transmission route 200 incorporating two low-link-cost directional communication links 118, 122 allows directional transmissions to the friendly aircraft 108 (e.g., via the friendly aircraft 106 as next-hop communications relay) at a lower link cost than would a direct transmission route 202 incorporating the constrained directional communications link 112

Figure 2:
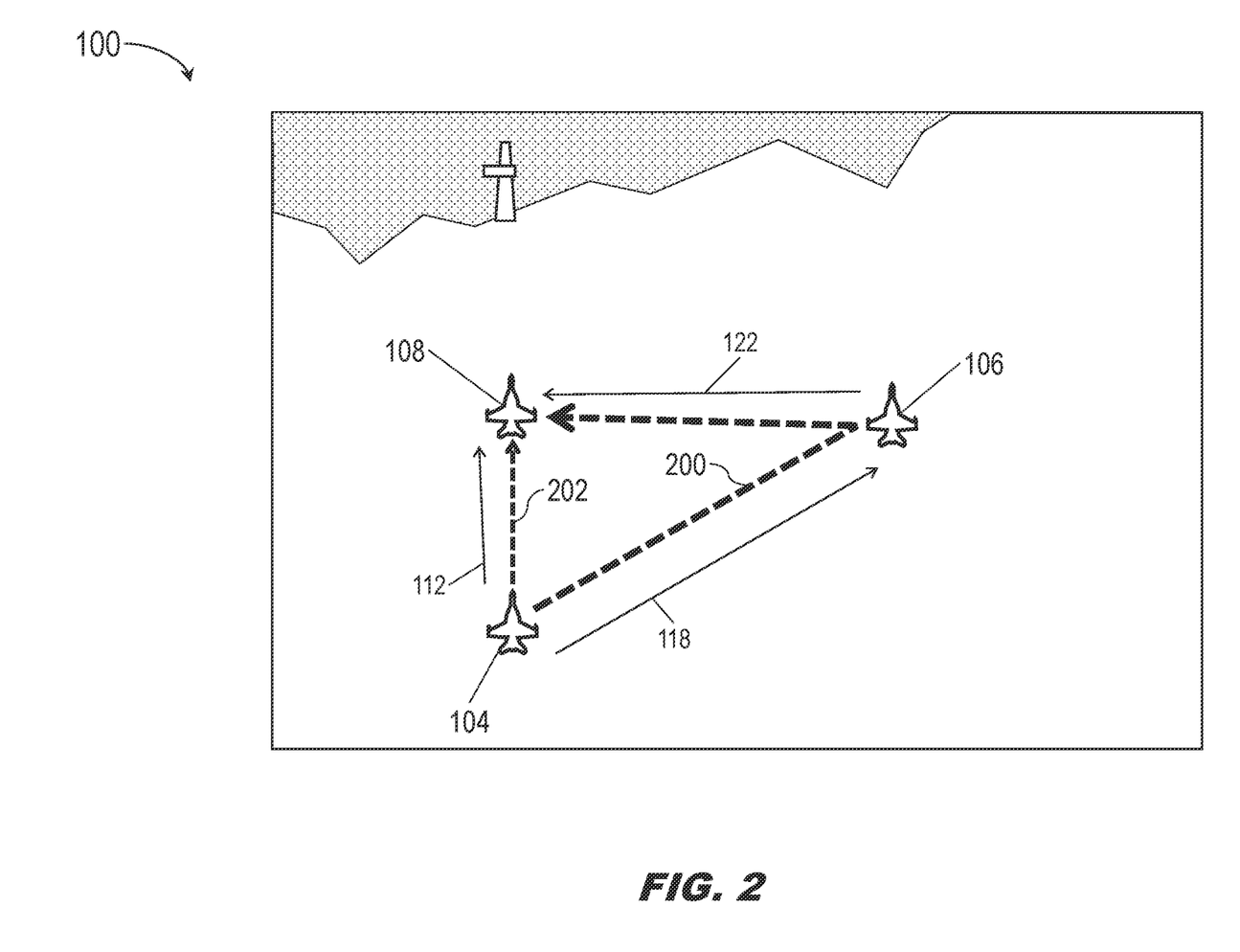
FIG. 2 is a diagrammatic overhead view of the contested environment of FIG. 1 wherein optimal transmission routes are determined via routing of directional communications to avoid constraint by geographic deadzones according to example embodiments of this disclosure.

In embodiments, the friendly aircraft 104, 106, 108 may identify geographic deadzones via mission parameters or mission intelligence (e.g., based on known locations and/or capabilities of known hostiles 102). Further, geographic deadzones (and associated hostiles 102) may be identified via sensors aboard the friendly aircraft 104, 106, 108 (or, e.g., the friendly asset 110, or other friendly network assets). In embodiments, based on shared link cost information, the network routing protocol shared by all network assets operating within the contested environment 100 (and implemented aboard each friendly aircraft 104, 106, 108 and/or friendly asset 110 as a node of the network) may determine the optimal transmission route between each pair of nodes, e.g., the friendly aircraft 104 transmitting to the friendly aircraft 108, including any relays or hops along the way as provided for by the lowest aggregated link cost among component directional transmissions 118, 122 (e.g., component links) of a transmission route 200 (or, as noted below, other definitions of an optimal transmission route as provided for by mission parameters).

Figure 3:
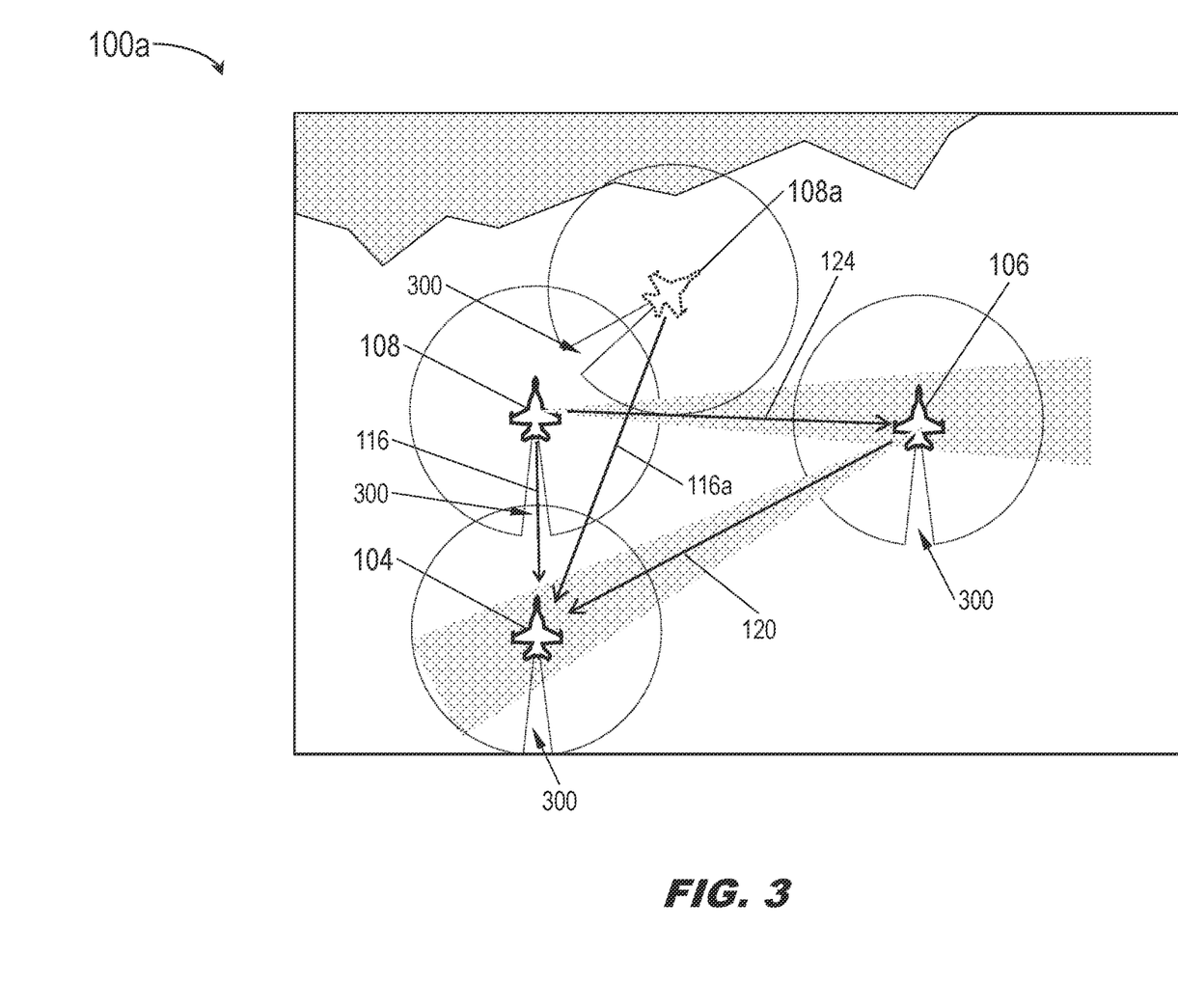
FIG. 3 is an overhead view illustrating routing directional communications through an uncontested environment to avoid constraint by platform deadzones according to example embodiments of this disclosure.

Referring now to FIG. 3, the environment 100a may be implemented and may operate similarly to the contested environment 100 of FIG. 1, except that the environment 100a may be a non-contested environment wherein hostiles (102, FIG. 1) are not known to operate.

Figure 4A:
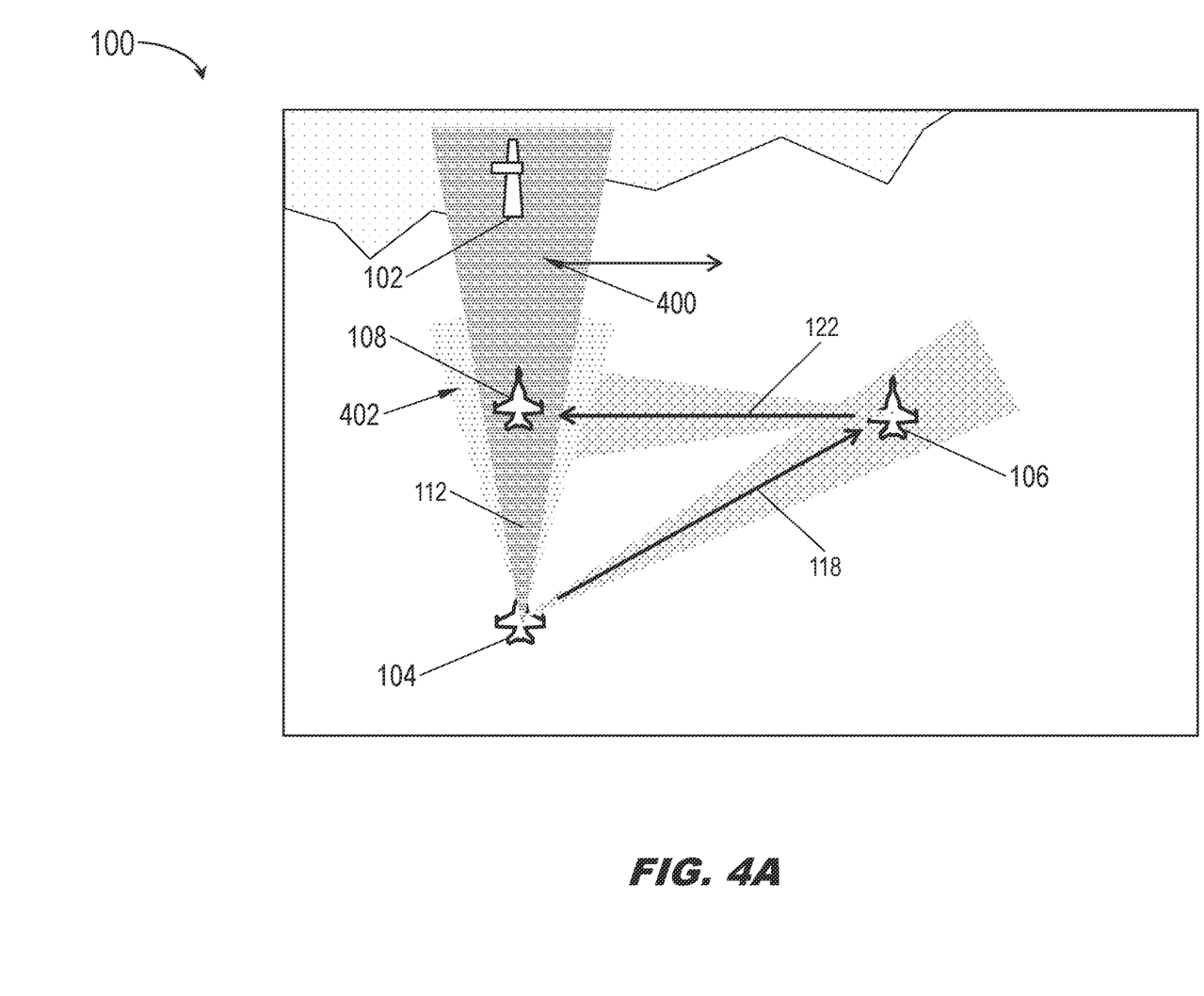
FIGS. 4A and 4B are overhead views illustrating routing directional communications through the contested environment of FIG. 1 to avoid constraint by geographic and platform deadzones.

In embodiments, the friendly aircraft 104, 106, 108; the friendly asset (110, FIG. 1); and any other friendly assets and/or platforms with which the friendly aircraft and/or friendly asset may communicate may each be subject to platform-type deadzones (e.g., blindspots) which place constraints on the directional transmission capability of a particular asset or platform. For example, platform deadzones may be natural consequences of a particular configuration of a network of nodes or of specific nodes, such that a network protocol may know and account for any such platform deadzones even in an uncontested environment 100a. Further, such platform deadzones may exist either in the uncontested environment 100a or in the contested environment 100 shown by FIG. 1, e.g., wherein the network protocol must account for known platform deadzones in addition to known geographic deadzones (as shown below by FIG. 4). In some embodiments, contested environments 100 may introduce additional types of platform deadzones, e.g., when a network node sustains physical damage or equipment failure that prevents directional transmissions in one or more directions.

In embodiments, each friendly aircraft 104, 106, 108 may be designed such that directional transmissions in a substantially aft direction are constrained by a platform deadzone 300 extending through an arc on either side of due aft of the aircraft. For example, the platform deadzone 300 may extend through a substantially 10-degree gap surrounding the due aft direction. In some embodiments, platform deadzones 300 may be associated with physical obstruction caused by platform payloads (e.g., cargo carried by the friendly aircraft 104, 106, 108); physical damage to the friendly aircraft that constrains directional transmission; or partial or full failure of transmitting equipment aboard the friendly aircraft.

In embodiments, the friendly aircraft 108 may assign the directional communications link 116 (to the friendly aircraft 104) a high link cost due to constraint by the platform deadzone 300. Accordingly, in determining an optimal transmission route to the friendly aircraft 104, the friendly aircraft 108 may select the two low-link-cost directional communications links 124, 120 (via the friendly aircraft 106 as relay hop) over the direct but high-link-cost directional communications link 116.

In some embodiments, link cost assignments may account for frequent changes in position by mobile platforms by assigning lower link costs (e.g., higher link priorities) to a directional communications link 116 constrained by a platform deadzone 300 than to a directional communications link (112, FIG. 1) constrained by a geographic deadzone (as described in greater detail directly below), although the link costs assigned to links constrained by platform deadzones may still be higher than the link costs assigned to unconstrained directional communications links 120, 124. For example, if the friendly aircraft 108 moves to a new relative position/orientation 108a (e.g., relative to the friendly aircraft 104, 106), the directional communications link 116a may no longer be constrained by the platform deadzone 300 and may therefore be assigned a lower link cost. Accordingly, the friendly aircraft (108a) may incorporate the directional communications link 116a into an optimal transmission route to the friendly aircraft 104 (e.g., rather than the indirect transmission route incorporating directional communications links 124, 120 and friendly aircraft 106 as relay hop).

In embodiments, platform deadzones 300 may be examples of mobile deadzones (e.g., in that a platform deadzone associated with inherent configurations or properties of a transmitting node, and obstructing transmission by the transmitting node in a particular direction, may move with the transmitting node). Further, if a hostile (102, FIG. 1) is embodied aboard a vehicle, manpack, or mobile platform, any geographical deadzones (as described in greater detail directly below) associated with detection (114, FIG. 1) of transmitted signals by the hostile may likewise shift position and/or orientation based on the movement of the embodying mobile platform.

Referring now to FIG. 4A, the contested environment 100 is disclosed.

In embodiments, the friendly aircraft 104 may assign the highest link costs and/or lowest link priorities to directional communications links 112 constrained by a geographic deadzone 400. For example, the known hostile 102 may be in RF line of sight to the directional communications link 112 from the friendly aircraft 104 to the friendly aircraft 108. Accordingly, any directional transmissions potentially detectable by the hostile 102 may be considered as within the geographical deadzone 400, such that the friendly aircraft 104 may preclude any transmissions within the geographical deadzone in the interest of lower probability of detection (LPD; e.g., low probability of interception (LPI)/low probability of geolocation (LPG)). If, for example, the friendly aircraft 104 is not able to control transmission power (402) to reduce the range of the directional communications link 112, the friendly aircraft 104 may instead (e.g., based on link cost assignment information received from the friendly aircraft 106, 108) select an indirect optimal transmission route to the friendly aircraft 108 via the low aggregate link cost directional communications links 118, 122 (e.g., using the friendly aircraft 106 as a communications relay hop).

Figure 4B:
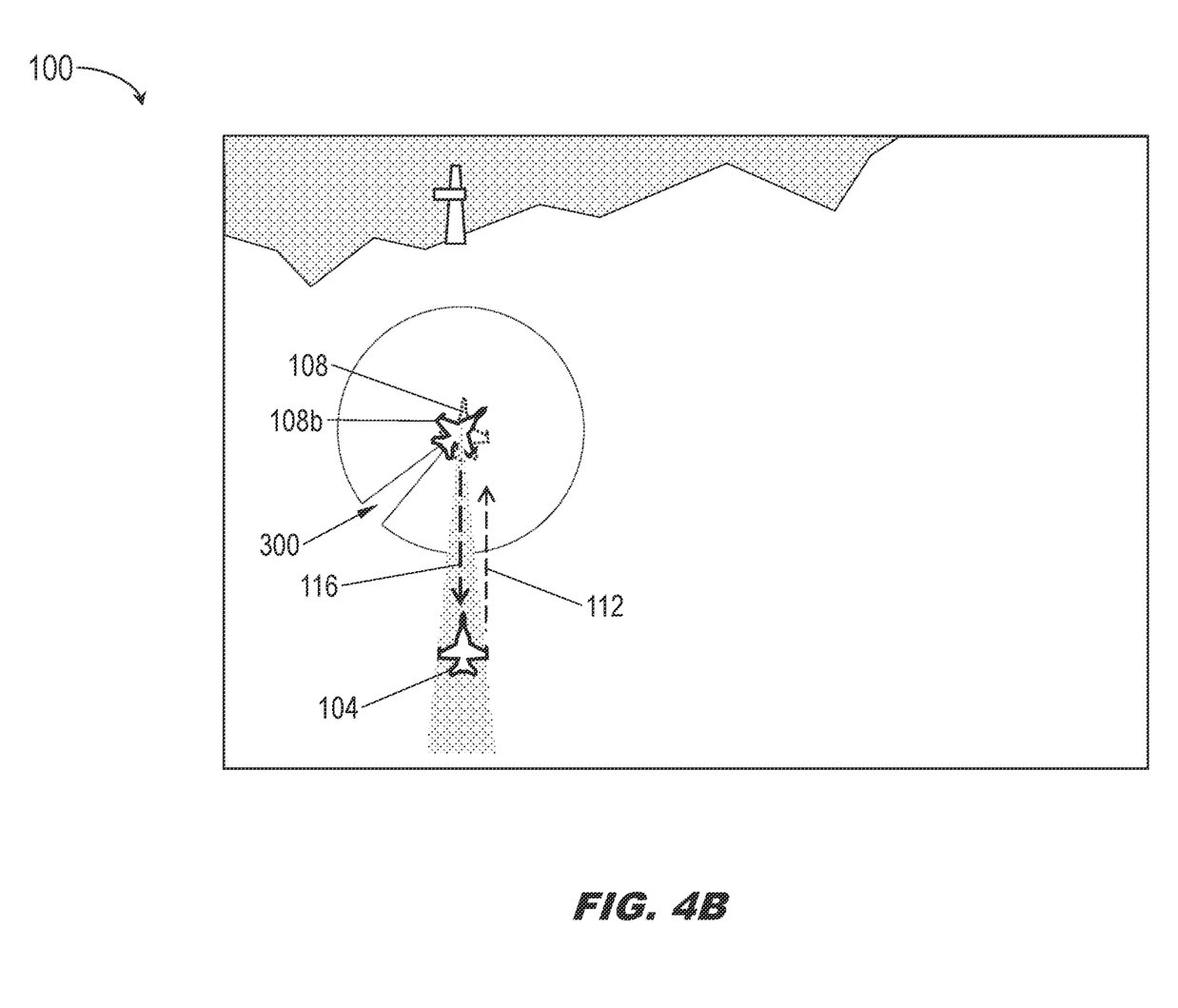

Referring also to FIG. 4B, in embodiments the friendly aircraft 108 may select the directional communications link 116 (e.g., oriented in substantially the opposite direction as the constrained directional communications link 112) as an optimal transmission route to the friendly aircraft 104, e.g., if the directional communications link is not otherwise constrained by a platform deadzone 300. For example, if the friendly aircraft 108 changes orientation (108b) relative to the friendly aircraft 104, the directional communications link 116 may not be constrained by the platform deadzone 300 and therefore may be selected by the friendly aircraft 108 as an optimal transmission route to the friendly aircraft 104.

Figure 5:
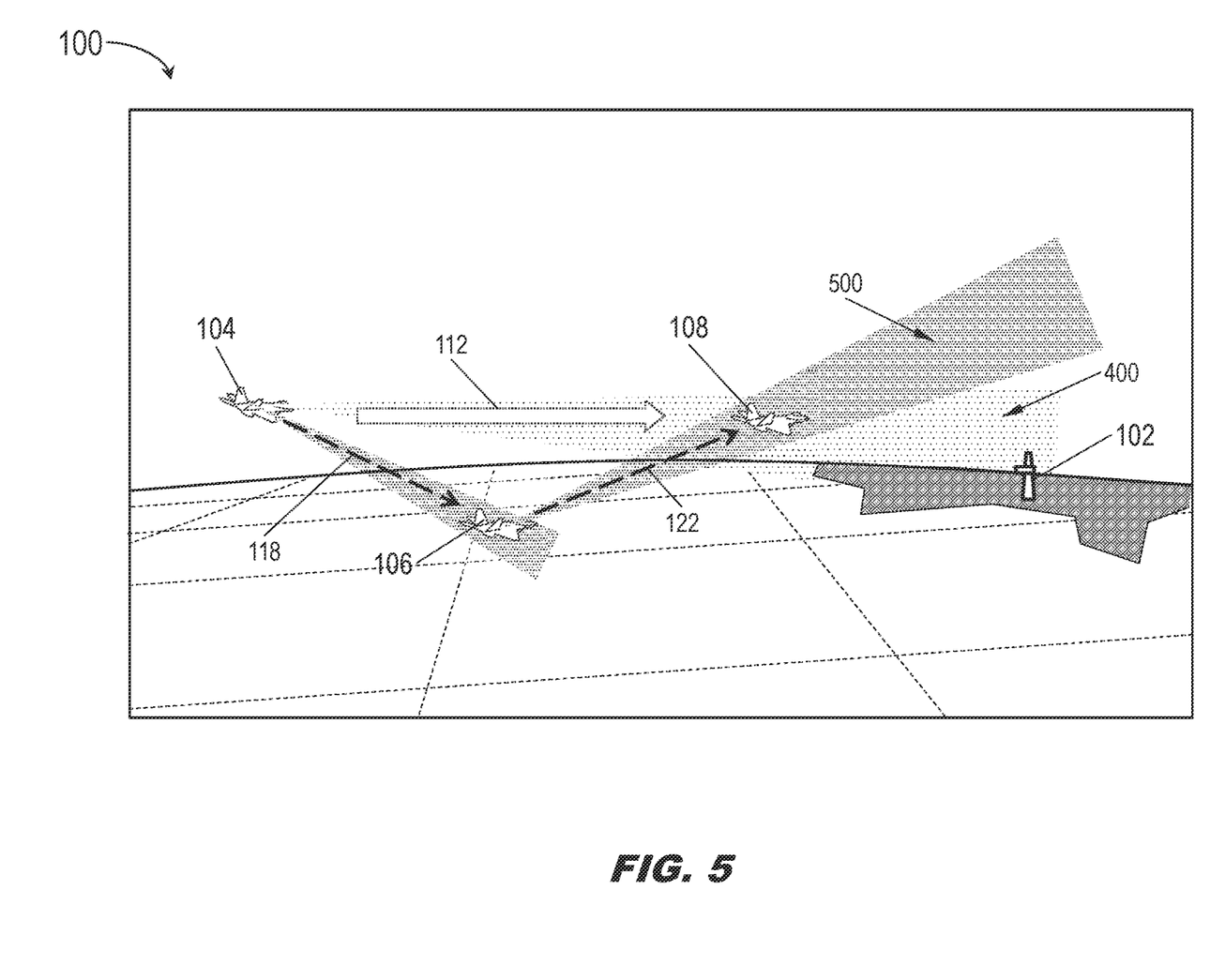
FIG. 5 is an isometric view illustrating three-dimensional routing of directional communications through the contested environment of FIG. 1 to avoid constraint by geographic deadzones.

Referring now to FIG. 5, the contested environment 100 is shown.

In embodiments, the deadzone routing protocol followed by the friendly aircraft 104, 106, 108 may evade geographic deadzones 400 via three-dimensional routing of directional transmissions. For example, the directional communications link 112 from the friendly aircraft 104 to the friendly aircraft 108 may be constrained by the geographic deadzone 400 due to the possibility of detecting/geolocating (114, FIG. 1) the directional communications link 112 by the hostile 102. However, the directional communications links 118, 122 may route messages from the friendly aircraft 104 to the friendly aircraft 108 (e.g., using the friendly aircraft 106 as a communications relay hop) in a substantially vertical plane allowing the main beam 500 transmitted via the directional communications link 122 to reach the friendly aircraft 108 without detection by the hostile 102.

Figure 6:
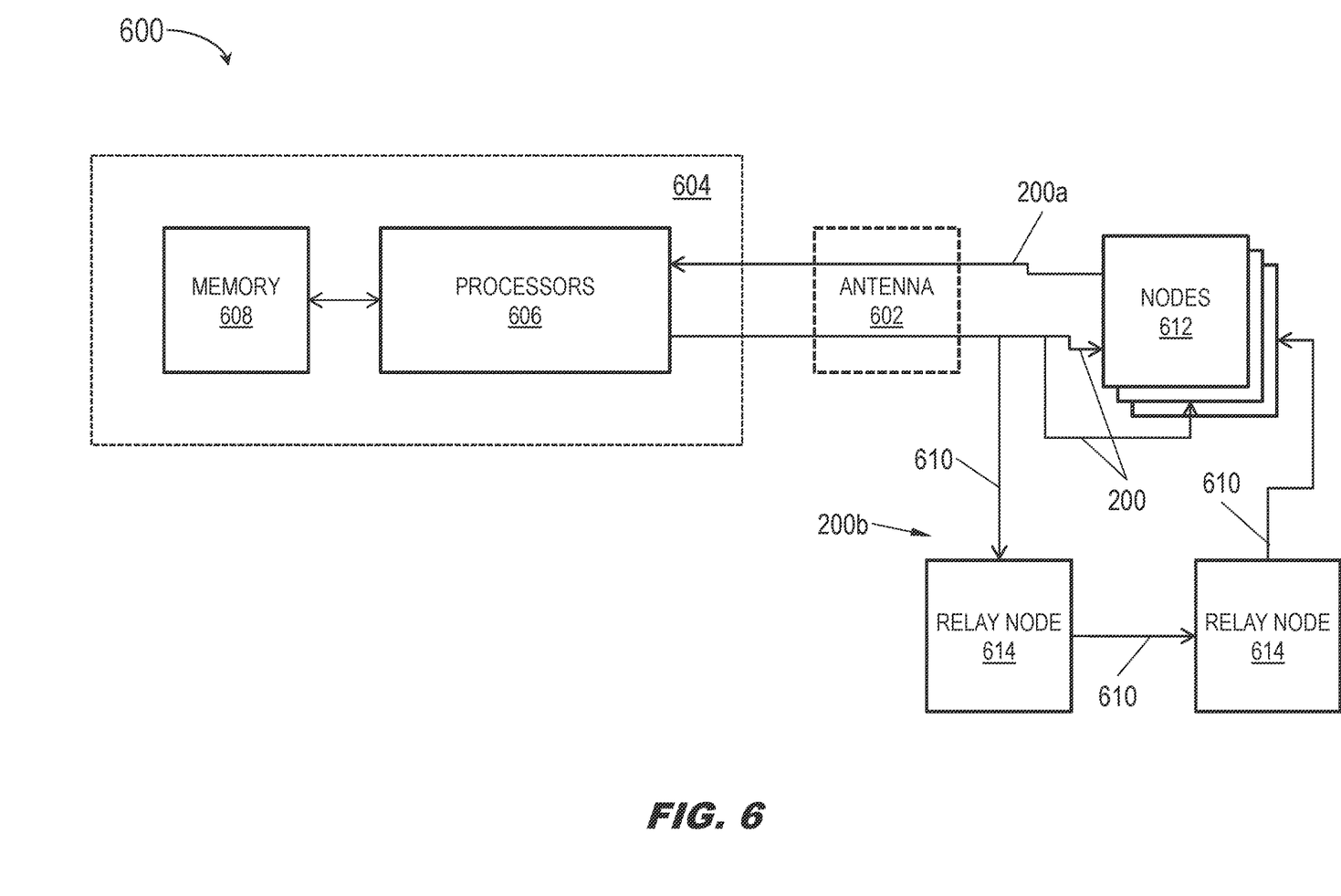
FIG. 6 is a block diagram of a transceiving (Tx/Rx) node of a multi-node communications network configured for determining optimal transmission routes to other network nodes via tactical routing of directional communications according to example embodiments of this disclosure.

Referring now to FIG. 6, a communications node 600 (e.g., transceiving node, Tx/Rx node) is shown. In embodiments, the communications node may include antenna elements 602, controller 604, processors 606, and memory 608

In embodiments, the communications node 600 may be embodied aboard the friendly aircraft 104, 106, or 108; the friendly asset 110; or any other ground-based or mobile platform implementing tactical directional communications with the friendly aircraft and/or friendly asset within the contested environment 100 shown by FIG. 1 et seq, and/or the uncontested environment 100a shown by FIG. 3.

In embodiments, the communications node 600 may include one or more antenna elements 602 for transmitting messages (e.g., via RF signal) via optimal transmission routes 200 incorporating one or more directional communications links 610 to a receiving network node (612; e.g., Rx node). For example, the communications node 600 may maintain a directional communications link 610 to each other node 612 within a multi-node communications network, each node embodied aboard another mobile or fixed platform (e.g., aircraft, water-based vehicles, ground-based fixed platforms, ground-based vehicles). Further, the communications node 600 may serve as a receiving (Rx) node by receiving (e.g., via RF signal) messages transmitted via transmission routes 200a established by other network nodes 612 (e.g., as transmitting nodes) to the communications node. In some embodiments, the communications node 600 may be configured for communications modes and/or protocols (e.g., laser communications, optical communications) that do not require antenna elements 602.

In embodiments, the controller 604 may include one or more processors 606 for generation (e.g., encoding, encrypting) of messages for transmission and for decoding/decrypting of received messages. Further, the controller 604 may include memory 608 and/or data storage for storing received messages in decoded/decrypted format. For example, the communications node 600 may acquire link cost assignment information via link status advertisements received from other aircraft, assets, and/or network nodes 612, storing the received link cost information to memory for use in determining optimal transmission routes 200 to each aircraft, asset, or node to which the communications node will transmit via directional communications links 610 (e.g., each transmission route comprising one or more component directional communications links).

In embodiments, the memory 608 may further be configured for storage of link quality information particular to the contested environment 100 (or, e.g., the uncontested environment 100a). For example, link quality information may include platform-specific information about platform deadzones (300, FIG. 3), e.g., known platform deadzones associated with design characteristics or payload complements. Further, link quality information may include the locations of hostiles (102, FIG. 1) or other obstructions associated with geographic deadzones (400, FIG. 4A). In embodiments, based on the available link quality information, and any link cost information received from other network nodes 612, the controller 604 may assess each directional communications link 610 to a network node 612 and assign a link cost or link priority to the directional communications link. Further, based on the assigned link costs and received link cost information, the controller 604 may determine an optimal transmission route 200 to each network node 612, each optimal transmission route comprising one or more directional communications links 610. For example, some multi-hop optimal transmission routes 200b may comprise one or more directional communications links 610 using one or more communications relay nodes 614 (e.g., directional communications links 610 from the communications node 600 to an intermediate relay node 614, from a first intermediate relay node to a second intermediate relay node, and/or from an intermediate relay node to the receiving network node 612). In some embodiments, the controller 604 may reassess current transmission routes 200 and/or link cost assignments, e.g., periodically or in response to new or revised link quality or link cost information.

Figure 7:
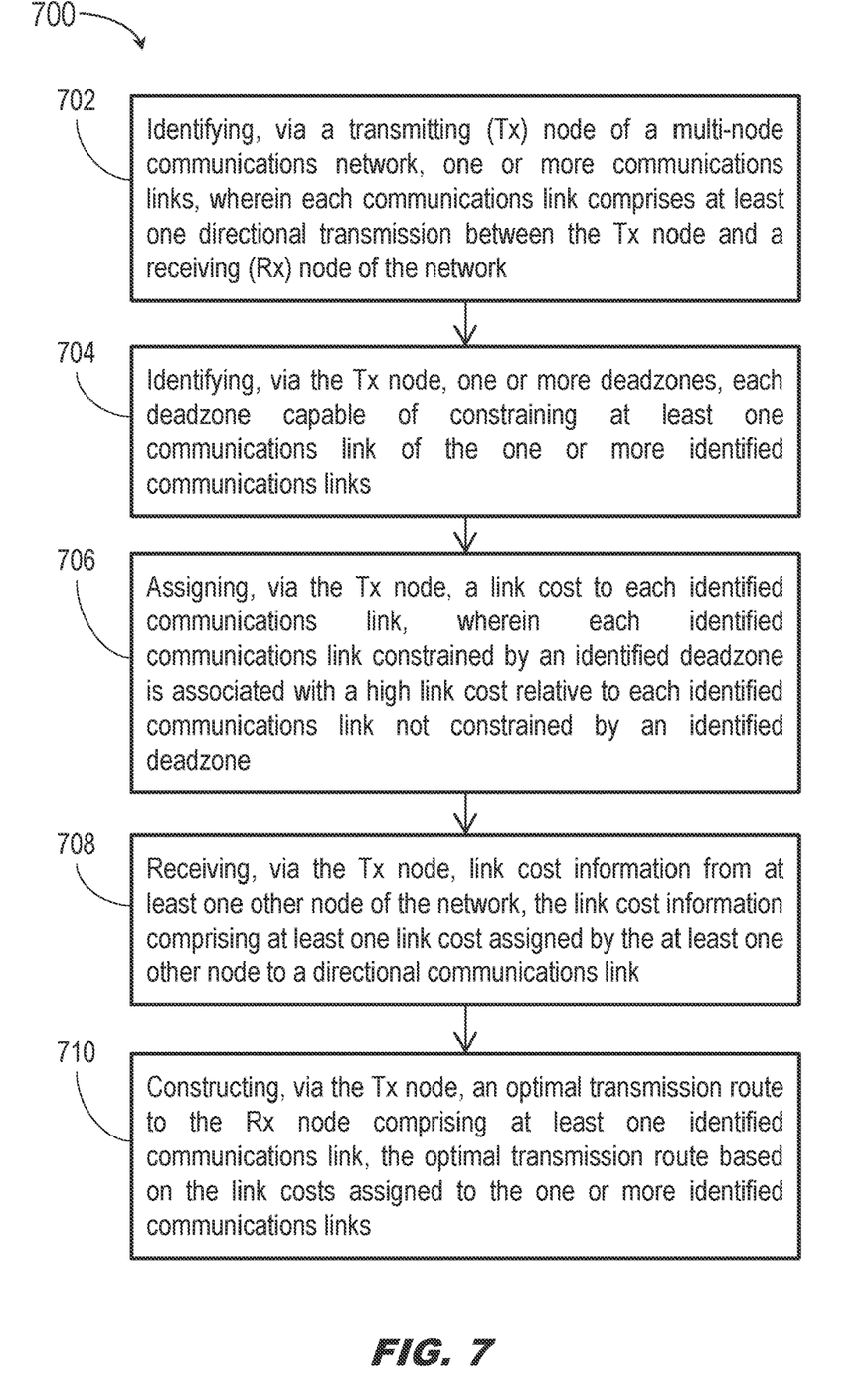
FIG. 7 is a flow diagram illustrating a method for tactical routing of directional communications according to example embodiments of this disclosure.

Referring now to FIG. 7, the method 700 may be implemented by the communications node 600 and may include the following steps.

At a step 702, a transmitting (Tx) node of a multi-node communications network identifies directional communications links to receiving (Rx) nodes of the network, the Tx node configured for transmitting messages to the Rx nodes. For example, the Tx node and Rx nodes may be mobile platforms (e.g., airborne, water-based, or ground-based vehicles; mobile manpacks) or ground-based facilities or outposts having a fixed location.

At a step 704, the Tx node identifies deadzones within the network, each deadzone capable of constraining one or more of the identified communications links, e.g., capable of constraining the Tx node from transmitting in a particular direction. For example, platform deadzones are associated with an inability of the Tx node to transmit in a particular direction, due to designed gaps in transmission capability, physical damage to the node, equipment failure, and/or physical obstructions (e.g., caused by placement of payload carried by a mobile platform). Further, geographic deadzones constrain the Tx node from transmitting in a particular direction due to external factors, e.g., to reduce or eliminate the probability of detection of a transmitted message by a hostile asset in RF line of sight of a directional communications link.

At a step 706, the Tx node assigns a link cost to each identified directional communications link based on available link quality and deadzone information. For example, constrained links are assigned high link costs (e.g., low link priorities), while non-constrained links are assigned lower link costs/higher link priorities. In some embodiments, links constrained by geographic deadzones are assigned higher link costs than links constrained by platform deadzones (as the internal factors creating a platform deadzone may be more subject to change, e.g., by a change in position or orientation of the Tx node relative to an Rx node).

At a step 708, the Tx node receives link cost information from other nodes in the network. For example, each node of the network identifies directional communications links via which that node may transmit to destination nodes (e.g., Rx nodes, from the perspective of the identifying node as Tx node), and assign link costs to the identified links based on identified deadzones and/or constraints. Each node then shares its own link assignments throughout the network, e.g., via link status advertisements.

At a step 710, the Tx node constructs or selects an optimal transmission route to each Rx node, each transmission route comprising one or more directional communications links, based on its own assigned link costs and/or link costs assigned to other directional links by other nodes, and shared with the Tx node via link status advertisements. For example, optimal transmission routes may be constructed to avoid known deadzones, or to achieve minimal link cost between the Tx and Rx nodes. Further, some optimal transmission routes between a Tx node and an Rx node may be indirect/multi-hop routes utilizing a third, fourth or additional nodes, e.g., incorporating a directional link from Tx node to a relay node, a directional link between two successive relay nodes, or a directional link from a relay node to the Rx node, as a communications relay for the transmitted message.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A communications node of a multi-node communications network, comprising:
    a communications interface configured for at least one directional transmission receivable by a receiving (Rx) node of the network;
    a controller operatively coupled to the communications interface, the controller including one or more processors and configured to:
        identify one or more communications links, wherein each identified communications link comprises at least one directional transmission by the communications node;
        identify one or more deadzones, each deadzone capable of constraining at least one communications link of the one or more identified communications links;
        assign a link cost to each identified communications link, wherein each identified communications link constrained by an identified deadzone is associated with a higher link cost;
        receive, via the communications interface, link cost information from at least one other node of the network, the link cost information comprising at least one link cost assigned by the at least one other node to a directional communications link; and
        construct an optimal transmission route from the communications node to the at least one Rx node based on one or more of the assigned link costs and the received link cost information, the optimal transmission route comprising at least one identified communications link.

2. The communications node of claim 1, wherein the optimal transmission route is associated with a minimal aggregate link cost of the one or more identified communications links.

3. The communications node of claim 1, wherein the one or more deadzones include one or more platform deadzones, each platform deadzone associated with at least one of:
    a gap in transmitting capability associated with at least one node of the network;
    a physical obstruction associated with at least one node of the network, the physical obstruction capable of constraining transmission by the associated node in at least one direction;
    an equipment failure associated with at least one node of the network;
    or
    physical damage to at least one node of the network.

4. The communications node of claim 1, wherein the one or more deadzones include one or more geographical deadzones, each geographical deadzone associated with one or more directions corresponding to a likelihood of detection of the directional transmission.

5. The communications node of claim 4, wherein:
    the one or more deadzones further include one or more platform deadzones;
    each identified communications link constrained by a platform deadzone is associated with a first link cost; and
    each identified communications link constrained by a geographical deadzone is associated with a second link cost, the second link cost greater than the first link cost.

6. The communications node of claim 1, wherein the one or more deadzones include one or more mobile deadzones.

7. The communications node of claim 1, wherein the one or more identified communications links include:
    at least one first directional transmission from a first node of the network to a second node of the network, the at least one first directional transmission constrained by at least one first deadzone of the one or more deadzones; and
    at least one second directional transmission from the second node to the first node, the at least one second directional transmission not constrained by the at least one first deadzone.

8. The communications node of claim 1, wherein at least one of the communications node or the Rx node is embodied aboard a mobile platform.

9. The communications node of claim 1, wherein the one or more processors are configured to construct the optimal transmission route from the communications node to the receiving node by incorporating into the optimal transmission route at least one identified communications link configured to avoid one or more identified deadzones, the incorporated communications link comprising at least one of:
   a first directional transmission from the communications node in a first direction to a relay node of the network;
   a second directional transmission from a first relay node in a second direction to a second relay node of the network;
   or
   a third directional transmission from a relay node of the network in a third direction to the receiving node.

10. The communications node of claim 9, wherein:
   the incorporated communications link is constrained by the identified deadzone in at least one constrained plane and not constrained by the identified deadzone in at least one non-constrained plane;
   and
   the optimal transmission route includes at least one directional transmission via the incorporated communications link and via the at least one non-constrained plane.

11. The communications node of claim 9, wherein:
   at least one of the first directional transmission, the second directional transmission, or the third directional transmission is configured to avoid the one or more identified deadzones by adjusting a transmission power.

12. A method for routing directional communications, the method comprising:
   identifying, via a transmitting (Tx) node of a multi-node communications network, one or more communications links, wherein each communications link comprises at least one directional transmission between the Tx node and a receiving (Rx) node of the network;
   identifying, via the Tx node, one or more deadzones, each deadzone capable of constraining at least one communications link of the one or more identified communications links;
   assigning, via the Tx node, a link cost to each identified communications link, wherein each identified communications link constrained by an identified deadzone is associated with a high link cost relative to each identified communications link not constrained by an identified deadzone;
   receiving, via the Tx node, link cost information from at least one other node of the network, the link cost information comprising at least one link cost assigned by the at least one other node to a directional communications link;
   and
   constructing, via the Tx node, an optimal transmission route to the Rx node comprising at least one identified communications link, the optimal transmission route based on one or more of the assigned link costs and the received link cost information.

13. The method of claim 12, wherein constructing, via the Tx node, an optimal transmission route to the Rx node comprising at least one identified communications link includes:
   constructing an optimal transmission route to the Rx node associated with a minimal aggregate link cost of the at least one identified communications link comprising the transmission route.

14. The method of claim 12, wherein identifying, via the Tx node, one or more deadzones includes:
   identifying one or more platform deadzones, each platform deadzone associated with at least one of:
      a gap in transmitting capability associated with at least one node of the network;
      a physical obstruction associated with at least one node of the network, the physical obstruction capable of constraining transmission by the associated node in at least one direction;
      an equipment failure associated with at least one node of the network;
      or
      physical damage to at least one node of the network.

15. The method of claim 12, wherein identifying, via the Tx node, one or more deadzones includes:
   identifying one or more geographical deadzones, each geographical deadzone associated with one or more directions corresponding to a likelihood of detection of the at least one directional transmission.

16. The method of claim 15, wherein identifying, via the Tx node, one or more deadzones includes identifying one or more geographical deadzones and one or more platform deadzones;
   and
   wherein assigning, via the Tx node, a link cost to each identified communications link includes:
      assigning a first link cost to each identified communications link constrained by at least one platform deadzone;
      and
      assigning a second link cost to each identified communications link constrained by at least one geographical deadzone, the second link cost greater than the first link cost.

17. The method of claim 12, wherein constructing, via the Tx node, an optimal transmission route to the Rx node comprising at least one identified communications link includes:
   constructing an optimal transmission route to the Rx node by incorporating into the transmission route at least one identified communications link configured to avoid the one or more identified deadzones, the at least one incorporated communications link comprising at least one of:
      a first directional transmission from the Tx node in a first direction to a relay node of the network;
      a second directional transmission from a first relay node in a second direction to a second relay node of the network;
      or
      a third directional transmission from a relay node of the network in a third direction to the Rx node.

18. The method of claim 17, wherein constructing an optimal transmission route to the Rx node by incorporating into the optimal transmission route at least one identified communications link configured to avoid the one or more identified deadzones includes:
   constructing an optimal transmission route to the Rx node incorporating at least one communications link constrained by an identified deadzone in at least one constrained plan and not constrained by the identified deadzone in at least one non-constrained plane, the at least one incorporated communications link including at least one directional transmission via the at least one non-constrained plane.

19. The method of claim 17, wherein constructing an optimal transmission route to the Rx node by incorporating into the optimal transmission route at least one identified communications link configured to avoid the one or more identified deadzones includes:

adjusting a transmission power associated with the at least one incorporated communications link.

\* \* \* \* \*